United States Patent Office 3,772,425
Patented Nov. 13, 1973

3,772,425
TREATMENT OF HALOGEN-CONTAINING GAS MIXTURE
Chia-Chen C. Kang, Princeton, and Robert A. Schreiber, Cranford, N.J., assignors to Pullman Incorporated, Chicago, Ill.
No Drawing. Filed Feb. 16, 1971, Ser. No. 115,882
Int. Cl. B01d 53/34; C01b 7/00
U.S. Cl. 423—239                                     24 Claims

ABSTRACT OF THE DISCLOSURE

This invention relates to a process for the purification of a halogen effluent obtained from the oxidation of an inorganic halide in the presence of an oxygen and nitrogen containing compound and involves contacting the effluent mixture containing not more than 1.5 weight percent water, hydrogen halide, halogen, oxygen and nitroxyl halide at a temperature of from about room temperature to about 175° F. under a pressure of from atmospheric to 50 atmospheres, with porous silica, maintaining the mole ratio of hydrogen halide to higher valent nitrogen compounds between about 2:1 and about 100:1. The porous silica, which is a type having a surface area in excess of 50 m.$^2$/g., acts as a catalyst to convert the nitroxyl halide and nitrogen dioxide which may also be present in the gaseous effluent to nitrosyl halide and can be employed alone or in admixture or composite with other metal oxides where the major portion of the mixture or composite composition is silica and where the surface area of the composition or composite is greater than 50 m.$^2$/g. The resulting nitrosyl halide can be easily separated from the halogen product by absorption in sulfuric acid or other suitable extraction agent or by distillation so that a halogen product of greater than 99.9% purity with respect to nitrogen contaminants can be recovered as the product of the process.

---

The manufacture of halogen at the present time must meet rather stringent requirements such as a maximum nitrogen and oxygen content less than about 10 p.p.m. for certain applications such as the production of halogenated hydrocarbon products of high purity. It has been found that when the level of contaminants in the halogen reactant, such as nitroxyl halide, is present in concentrations of 0.05 to 0.5% the hydrocarbons halogenated with this halogen are contaminated to an extent that corrosion of equipment and the formation of by-products in the halogenation zone severely affects the economy and efficiency in the utilization of these products.

In order to overcome the contamination difficulty, several processes have been employed such as distillation of the halogen-containing effluent and extraction of the effluent with carbon tetrachloride. These methods have not proven satisfactory either from the standpoint of sufficiently lowering the contaminant level or of the economy and efficiency of the treatment employed. For example, at distillation temperatures certain oxides of nitrogen form an azeotrope with the halogen which calls for involved separation techniques to free the halogen product. On the other hand, extraction with carbon tetrachloride is an expensive treatment. Various drying agents have also been used but these have been unable to remove nitroxyl halide which contaminant is the most deleterious and difficult to remove of those associated with the halogen product.

It is, therefore, an object of the present invention to provide an inexpensive and commercially feasible method for the removal of contaminants from halogen product.

It is another object of this invention to provide a decontaminating method which avoids the formation of azeotropes and the use of toxic materials.

Another object of this invention is to provide a purification of halogen mixtures which results in the recovery of halogen having nitrogen compound contaminant concentration as low as 1 part per million (p.p.m.)

Still another object of this invention is to avoid the loss of halogen product in the purification treatment.

Still another object is to provide a purification treatment which does not require frequent regeneration or interruption of the overall process for the manufacture of halogen.

These and other objects will become apparent from the following description and disclosure.

In accordance with the present invention, an oxidation effluent containing halogen as a product of the process is obtained and, after the water concentration is adjusted to not more than 1.5 weight percent, preferably 0.5 weight percent or less of the total mixture, the effluent is contacted with silica having a high surface area, between about 50 m.$^2$/g. and about 700 m.$^2$/g., preferably between 100–650 m.$^2$/g., in a purification zone containing one or more beds of solid silica or silica-containing $SiO_2$ particles having an average diameter of between about 25 and about 0.1 mm. The contacting of the effluent with the silica is carried out in the presence of a hydrogen halide which contains a halogen moiety corresponding to the halogen product of the process. The halide is maintained in the silica contacting zone in a mole ratio of between about 2 and about 100 with respect to the contaminants containing nitrogen, oxygen and halogen and a mole ratio of between about 1 and about 100 with respect to nitrogen oxide contaminant such as nitrogen monoxide, nitrogen dioxide or nitric acid, any one of which or any combination of which is present in the effluent mixture.

The halogen containing effluents employed in the present process are those which are obtained from the oxidation of an inorganic halide such as hydrogen halide or an alkali metal halide, such as potassium halide. The oxidizing agent in such a reaction may be oxygen or air which is promoted with an oxygen-nitrogen containing compound such as nitrogen dioxide, nitrogen monoxide, nitrosyl halide, nitroxyl halide, nitric acid or mixtures thereof, or the oxidizing agent can be the oxygen-nitrogen containing compound in the absence of oxygen or air, for example, nitroxyl halide or nitric acid. The preferred inorganic halides which are subjected to the oxidation treatment are hydrogen chloride, potassium chloride or hydrogen bromide.

The effluents from such oxidation reactions usually, but not always, contain substantial quantities of water which is produced as a byproduct in the process. When the water content of the effluent exceeds 1.5 weight percent of the total mixture, the effluent is preferably dried with a convenient drying agent such as concentrated sulfuric acid of 75% or higher, preferably 85% or higher acid concentration, calcium chloride, silica, or any other drying agent until the concentration level of water is reduced to at least 1.5 weight percent, most preferably 0.5 weight percent or less. Any combination of these drying agents can also be employed. In this way the feed is conditioned for purification with the high surface silica in a silica contacting zone. It should be understood, however, that in many cases the effluent is obtained from the oxidizer with a water concentration of 1.5 weight percent or less. It should also be understood that where silica or a silica-containing molecular sieve is used as a drying agent, the same high surface area silica or silica compound as used for the conversion of contaminants to nitrogen halide can be used throughout in a single contacting zone to preform both drying and decontamination of the halogen product, even in cases where the water concentration exceeds 1.5 weight percent. In the latter case, the silica gradually loses its ability to absorb water as equilibrium conditions of water in the gas phase are approached. However, the catalytic ability of the silica to convert $NO_2Cl$ and/or $NO_2$ to $NOCl$ continues. Alternatively, the portion of the contacting zone where the effluent enters may comprise a separate bed of silica or silica-containing molecular sieve with or without means for separate removal and replacement when a bed of $SiO_2$ follows.

In another embodiment the silica-containing molecular sieve may be used throughout the contacting zone. Where concentrated sulfuric acid is used as a drying agent in a drying zone, a demister may be employed for exiting gases to prevent carryover of $H_2O$ and/or $H_2SO_4$ mist.

The contacting of effluent with silica in the silica contacting zone may be carried out with a fluidized bed or a fixed bed of silica solid particles. The silica particles may be deposited on one or more trays of a contacting column. When the effluent contains in excess of 1.5 weight percent water, it is preferably contacted with a plurality of fixed beds of silica or a dense bed of silica and is passed upwardly through the successive catalyst beds or dense bed in the column. The temperature at which this contacting treatment takes place is maintained between about 0° F. and about 450° F., preferably between about 70° F. and 175° F.; under a pressure of from atmospheric to about 50 atmospheres, preferably from about atmospheric to about 20 atmospheres, and most preferably from about 5 to about 16 atmospheres.

The contacted effluent removed from the contacting zone is passed to a removal zone where nitrogen compounds are removed and a halogen product in a purity above 99.99 weight percent with respect to nitrogen compound contaminant is obtained.

For the purposes of the process of the present invention, the high surface area silica catalyst must meet certain rigid requirements. Specifically, the silica or silica-containing solid material must be employed in a form which presents a large surface area and adequate pore size to effectively carry out its function in the present process. A silica having a surface area between 50 and 750 m.²/g. is necessary to provide the catalytic function in the present process. The pore size of the silica or silica portion of a mixture or silica containing molecular sieve is most preferably between about 20 A. and about 650 A.

In the process of this invention the main function of the silica is that of a catalyst which serves to convert difficulty separable nitroxyl halide to nitrosyl halide. As a catalyst, the silica also promotes the conversion of nitrogen monoxide contaminant to nitrogen dioxide and nitrogen dioxide to nitrosyl halide. A secondary function of the catalyst is that of removing water which may be present, usually in minor amount, e.g., less than 1.5 weight percent, when a predrying treatment is employed. It has been found that, when a halogen containing effluent is treated with a drying agent such as sulfuric acid, most of the nitrogen dioxide and nitrosyl halide compounds in addition to water are absorbed and removed by the sulfuric; however, nitroxyl halide is relatively unaffected by the sulfuric acid and substantial quantities of nitrogen monoxide are passed through the sulfuric treater with the halogen product in an unchanged condition. These difficulty removable contaminants, if allowed to remain with the halogen product in an amount greater than 50 parts per million, promote undesirable side reactions in halogenation processes where the halogen is employed for conversion of hydrocarbons, and wherein the resulting halohydrocarbon must be obtained in a substantially pure state in order to avoid detrimental effects such as hindrance of subsecquent polymerization of production of poor quality polymer or corrosion in equipment. The silica employed in the present process must meet the requirements set forth above in order to catalyze the reaction of normally nonabsorbable contaminants, i.e., two or five valent nitrogen compounds to an absorbable form or three valent nitrogen compounds.

In the secondary function of silica or silica-containing material as a drying agent, the concentration of water in the silica can be allowed to build up, for example, to about 1–3 weight percent, after which it is preferably regenerated by contacting with a stripping gas, such as for example, nitrogen, oxygen, air, helium, $CO_2$, combustion gas, superheated steam, etc.

It is found that when the concentration of water in the purification zone is greater than 3 weight percent, the silica fails to function efficiently as a drying agent. It is preferred that the water concentration in the feed to the purification zone does not exceed 1.5 weight percent for the reason that additional quantities of water are formed by the conversion of nitroxyl halide and nitrogen dioxide to nitrosyl halide, as shown in the following equations:

$$2NO + O_2 \longrightarrow 2NO_2 \xrightarrow{4HCl} 2NOCl + Cl_2 + 2H_2O \quad (1)$$
$$NO_2Cl + 2HCl \longrightarrow NOCl + Cl_2 + H_2O \quad (2)$$

This small amount of water formed in Equations 1 and 2 can be taken up by the silica when the amount of nitroxyl halide contaminant in the effluent is relatively small, for example, less than 10,000 p.p.m. and when the silica contains less than 4.5 weight percent water.

It is to be understood that mixtures of silica with minor amounts of other high surface area components such as alumina, titania, zirconia, etc., can be employed. Such mixtures can be prepared or can be obtained from natural or from manufactured sources such as molecular sieves. It is preferred, however, that in these mixtures, the ratio of silica to another metal oxide component be 4:1 or higher. When molecular sieves are employed, the same surface area ranges apply to the combined composition as required for substantially pure silica.

The residence time of the effluent in the silica contacting zone is dictated by the particular surface area of the silica catalyst and the temperature and pressure conditions employed. In cases where the concentration of nitroxyl halide is less than 0.1 part per part of the entire mixture, the average residence time satisfactorily employed in the present process is within the range of from 0.25 to about 30 seconds at atmospheric pressure and ambient temperature. However, when the pressure is raised to 25 or 50 atmospheres the space velocity based on standard volume of effluent can be increased. As a general rule, at ambient temperature and atmospheric pressure, the contact time based on the standard volume of the effluent gaseous mixture with high surface area silica averages between about 0.5 and about 15 seconds. It should be understood, of course, that the contact time can be adjusted for variations of temperature and pressure. For example, at higher temperature, such as from about 175° to 250° F., the contact time is extended to between 5 to 25 seconds; whereas under a pressure of from 5 to 15 atmospheres the contact time based on standard volume of effluent is preferably shortened to 0.8 to 12 seconds. The flow rate of the effluent through the contacting zone can be controlled by pressure, by the density of catalyst beds and the feed rate to meet the purification needs of a particular feed composition.

The effluent removed from the contacting zone, after treatment with silica, can be passed to an after treating zone wherein minor amounts of absorbable contaminants are removed. A preferable treatment comprises passing the effluent through sulfuric acid having an acid concentration of 85 to 100 percent, preferably 90–98 percent, at a temperature between about 65 to 200° F., preferably at ambient temperature. Any oxygen or nitrogen gas which is admixed with halogen can be separated, e.g., in an inert still and the halogen product obtained in a highly purified state. The nitrosyl halide and nitrogen dioxide recovered from the halogen effluent can be conveniently recycled directly to the oxidation zone to catalyze the oxidation of halogen halide or the nitrosyl halide can be condensed and recycled. It is understood, however, that these nitrogen compounds need not be recycled directly but may be further reacted, for example, to produce nitric acid before recycle to the oxidation zone, if desired. Alternatively, the oxide of nitrogen compounds may be used as reactants in other processes.

The process of the present invention is more specifically illustrated by the following examples which are not to be construed as limiting to the scope of the invention:

EXAMPLE 1

Effluent gas at 5-15 atm. from a HCl to $Cl_2$ conversion process having the composition below was contacted continuously with 90-95% sulfuric acid in a tower packed with ceramic rings or saddles.

FEED GAS COMPOSITION

| | Percent by weight | Mol percent |
|---|---|---|
| Component: | | |
| HCl | 2.64 | 4.79 |
| $Cl_2$ | 92.63 | 86.44 |
| $O_2$ | 2.76 | 5.70 |
| $H_2O$ | 0.31 | 1.15 |
| NOCl | 1.05 | 1.06 |
| $NO_2$ | 0.48 | 0.70 |
| $NO_2Cl$ | 0.03 | 0.02 |
| Inerts (as $N_2$) | 0.10 | 0.24 |

The exit gas contained less than 10 parts per million (p.p.m.) water. Also, about 90% of the combined $NO_2$ and NOCl were removed. The gas at 5-15 atm. was next led through a bed of silica-gel particles, having about 1/8″ average diameter and a surface area of 350 m.$^2$/g. and a pore size of about 50 A. A contact time of 1-10 seconds was used. The exit gas contained less than 10 parts per million water and essentially undetectable $NO_2Cl$. It had the following composition:

| | Percent by weight | Mol percent |
|---|---|---|
| Component: | | |
| HCl | 2.82 | 5.16 |
| $Cl_2$ | 93.44 | 87.90 |
| $O_2$ | 2.78 | 5.80 |
| NOCl | 0.81 | 0.82 |
| $NO_2$ | 0.05 | 0.07 |
| Inerts (as $N_2$) | 0.10 | 0.25 |

The gas was next contacted countercurrently with 96-98% sulfuric acid in a tower packed with ceramic rings or saddles. The resulting gas contained less than 10 parts per million by volume nitrogen compounds. The product gas may be condensed or partially condensed to separate $O_2$ from the $Cl_2$ and HCl. Fractional distillation then separates HCl from the $Cl_2$ should that be desired. For most uses, the small amount of HCl in the $Cl_2$ is not harmful.

EXAMPLE 2

A metered flow of nitrogen was passed through a glass saturator containing $NO_2Cl$ maintained at Dry Ice-acetone temperature. Metered flows of chlorine, hydrogen chloride and oxygen were blended into the gas mixture to simulate the effluent obtained from a process for the oxidation of HCl in the presence of an oxide of nitrogen compound. Generally, the $NO_2Cl$ concentration in such effluent mixtures is between about 0.01 and about 1 percent.

In the first 6.5 hours run time in the present example the mixture contained 2308 p.p.m. of $NO_2Cl$. The average composition of the feed throughout the run is as follows:

| | Mol percent | Weight percent |
|---|---|---|
| $NO_2Cl$ | 0.3 | 0.4 |
| $N_2$ | 16.1 | 8.1 |
| $Cl_2$ | 74.4 | 85.9 |
| HCl | 4.4 | 2.9 |
| $O_2$ | 4.8 | 2.6 |

In the present example 0.0114 pound of $NO_2Cl$ per hour per pound of silica was passed upwardly through a 12 inch bed of high surface area silica gel particles (Houdry macroporous $SiO_2$ beads of 1/8 inch average diameter) having a surface area of 500 m.$^2$/g. Over the first 6.5 hour period the gaseous feed was passed at an hourly space velocity of 662 through the 12 inch bed at room temperature.

In the remaining 4.5 hours of the run, the concentration of $NO_2Cl$ was increased to 3028 p.p.m. and a space velocity of feed through the 12 inch catalyst bed was maintained at 1289 at room temperature so that 0.0313 pound of $NO_2Cl$ per hour per pound of silica was fed into the contactor.

The contacting of the gaseous mixture with silica was carried out in a 1/2 inch I.D. x 3 foot glass contactor which was protected to a height of 12 inches with electrical heating tape. The gaseous effluent removed from the contacting zone was passed through an infrared cell mounted in a Perkin Elmer Model 21 Spectrophotometer which was used as an in-line analyzed. After analysis the gas was then bubbled through caustic solution and vented to the atmosphere. A bypass system was installed so that samples of the composite feed as well as the $N_2/NO_2Cl$ feed could be analyzed by infrared before passing through the bed of silica catalyst. All glassware in the apparatus, including Teflon tubing lines to and from the infrared cell, the cell and chlorine rotameter were taped with asbestos so that the entire assembly was protected from light during operation, although subsequent tests established that protection from light is not necessary.

After the first 6.5 hours the cumulative flow of pound of $NO_2Cl$ passed through the bed per pound of silica was 0.0756, the cumulative flow of pounds of total feed/pound of silica was 26.8 and the cumulative pounds of chlorine/pound of silica was 23.6. After a total of 11 hours, the cumulative pound of $NO_2Cl$/pound of silica was 0.207, the cumulative pounds of total feed/pound of silica was 59.57 and the cumulative pounds of chlorine/pound of silica was 52.4.

Of the 13 samples of gaseous silica-treated effluent taken at hourly and half hourly periods, all showed about 100% decomposition of $NO_2Cl$ or 100% conversion of $NO_2Cl$ to NOCl.

EXAMPLE 3

The general procedure with the apparatus outlined in Example 2 was continued to 14 hours with substantially the same feed composition, except that the catalyst bed was reduced to 3 inches, the operating temperature was raised to 140° F. The feed composition and flow rates remained substantially constant throughout the run and were as follows:

Concentration $NO_2Cl$ in feed, p.p.m. ......... 2906
Pound $NO_2Cl$/hour ..................... 0.00053
Pound of $NO_2Cl$/hour/pound silica ........... 0.053
Space velocity (cc./hr./cc. $SiO_2$) ........... 2403
Cumulative pound $NO_2Cl$/pound $SiO_2$ ........ 0.3809
Cumulative pound total feed/pound silica ..... 106.15
Cumulative pound chlorine/pound silica ...... 93.33

After the completion of the run, analysis showed that about 94% of the $NO_2Cl$ had been decomposed by conversion to NOCl.

EXAMPLE 4

The general procedure with the apparatus outlined in Example 2 was continued to 16.5 hours with substantially the same feed composition and silica contact material. A 3 inch catalyst bed was maintained in this example and the operating temperature was raised to 146° F. The feed composition and flow rates remained substantially constant during this run. The conditions maintained in the zone are as follows:

| | |
|---|---|
| Concentration $NO_2Cl$ in feed, p.p.m. | 5467 |
| Pound $NO_2Cl$/hour | 0.00031 |
| Pound of $NO_2Cl$/hour/pound silica | 0.031 |
| Space velocity (cc./hr./cc. $SiO_2$) | 791 |
| Cumulative pound $NO_2Cl$/pound $SiO_2$ | 0.4507 |
| Cumulative pounds total feed/pound silica | 115.87 |
| Cumulative pounds chlorine/pound silica | 101.03 |

The reduction in space velocity to a level of 791 resulted in 100% decomposition of $NO_2Cl$ in the effluent gas mixture to NOCl.

EXAMPLE 5

The procedure with the apparatus outlined in Example 2 was continued to 22.5 hours with substantially the same feed composition and silica contact material. A 3 inch catalyst bed was maintained and the operating temperature was varied to test the effect of temperature on $NO_2Cl$ removal. From 16.5 to 19.5 hours the catalyst bed was maintained at 143° F., after which time the temperature was allowed to decrease in the next 1.5 hours to 122° F. and finally in the last 1.5 hours to room temperature. The feed composition and flow rates remained substantially constant during this run. The conditions maintained in the contacting zone are as follows:

| | |
|---|---|
| Concentration $NO_2Cl$ in feed, p.p.m. | 2598 |
| Pound $NO_2Cl$/hour | 0.0003 |
| Pound of $NO_2Cl$/hour/pound silica | 0.0299 |
| Space velocity (cc./hr./cc. $SiO_2$) | 1418 |
| Cumulatvie pound $NO_2Cl$/pound $SiO_2$ | 0.6310 |
| Cumulative pounds total feed/pound silica | 163.75 |
| Cumulative pounds chlorine/pound silica | 141.13 |

Samples taken on a half hourly basis at from 17 to 19.5 hours run time showed that the $NO_2Cl$ decomposition varied between 91 and 95%. The same was true for the next 1.5 hour period at 122° F. When the contacting zone finally reached room temperature in the last 1.5 hour period, about 100 percent decomposition of $NO_2Cl$ was attained. Better results would have been obtained had the space velocity been reduced to about 1000 in the first portion of the run at high temperature. Generally, higher temperatures should be used with longer residence time or lower space velocities.

EXAMPLE 6

The same procedure as above was continued to 25 hours with a 3 inch catalyst bed at room temperature. The feed composition and flow rates were as follows:

| | |
|---|---|
| Concentration $NO_2Cl$ in feed, p.p.m. | 3663 |
| Pound $NO_2Cl$/hour | 0.0004 |
| Pound of $NO_2Cl$/hour/pound silica | 0.04 |
| Space velocity (cc./hr./cc. $SiO_2$) | 1432 |
| Cumulative pound $NO_2Cl$/pound $SiO_2$ | 0.731 |
| Cumulative pounds total feed/pound silica | 183.7 |
| Cumulative pounds chlorine/pound silica | 157.76 |

Five samples taken every half hour from 22.5 to 25 hours show that 100% $NO_2Cl$ was decomposed from the gaseous mixture.

EXAMPLES 7–15

The conditions maintained in the following examples are outlined in Table I. In each case the run was continued with the same apparatus and procedure as in Example 2 within the time indicated. A 3 inch catalyst bed at room temperature was maintained in each case. During the run substantially constant feed compositions and flow rates were also maintained. The results are reported as follows:

TABLE I

| Example numbers | 7 | 8 | 9 | 10 | 11 | 12 | 13 | 14 | 15[1] |
|---|---|---|---|---|---|---|---|---|---|
| Concentration $NO_2Cl$ in feed, p.p.m. | 3,000 | 2,719 | 2,177 | 2,757 | 2,757 | 2,654 | 3,121 | 2,971 | 2,97 |
| Pound $NO_2Cl$/hour | 0.00031 | 0.00049 | 0.00053 | 0.0008 | 0.00089 | 0.00102 | 0.00125 | 0.00125 | 0.00125 |
| Pound of $NO_2Cl$/hour/pound silica | 0.031 | 0.049 | 0.046 | 0.08 | 0.089 | 0.1020 | 0.1250 | 0.125 | 0.125 |
| Space velocity (cc./hr./cc./ $SiO_2$) | 1,426 | 2,399 | 3,114 | 3,847 | 4,339 | 5,077 | 5,221 | 5,465 | 5,465 |
| Cumulative duration of run (hour) | 32 | 34 | 37 | 44.5 | 47.5 | 50.25 | 52 | 57 | 62 |
| Cumulative pounds $NO_2Cl$/(pound) $SiO_2$ | 0.9635 | 1.0444 | 1.1879 | 1.7679 | 2.0598 | 2.3199 | 2.5474 | 3.1862 | 3.7975 |
| Cumulative pounds total feed/pound silica | 242.16 | 265.98 | 323.08 | 384.76 | 567.58 | 643.52 | 699.39 | 862.98 | 1,019.73 |
| Cumulative pounds chorine/pound silicas | 207.44 | 228.41 | 278.39 | 417.37 | 489.17 | 555.7 | 604.60 | 748.04 | 885.3 |
| Percent $NO_2Cl$ decomposed in gaseous feed | 100 | 100 | 100 | 95–96 | 95 | 91–92.5 | 93–94 | 92–93 | 90 |

The silica gel catalyst in the latter runs from 60 to 62 hours duration showed practically no absorption of water formed in the reaction. It was calculated that, in the 62 hours of operation the water produced amounted to 80–85% by weight of the silica, most of this water of formation was present in the silica treated outlet gas. This catalyst was removed from the contacting zone and regenerated in a muffle furnace at 450° F. to constant weight over a period of 5 hours. The catalyst showed a weight loss of 4.3% after contacting about 4 pounds of $NO_2Cl$ contaminant. The regenerated catalyst was then returned to the contacting zone to provide a regenerated catalyst bed of 3 inches for further contact with the feed gas mixture reported in Example 1.

EXAMPLES 16–23

The following runs were continued with regenerated $SiO_2$ catalyst for another 42 hours using the procedure and apparatus outlined in Example 2. The feed compositions and flow rates remained substantially constant during each run and the conditions employed are reported in Table II.

TABLE II

| Example numbers | 16 | 17 | 18 | 19 | 20 | 21[1] | 22[1] | 23 |
|---|---|---|---|---|---|---|---|---|
| Concentration $NO_2Cl$ in feed. p.p.m. | 2,542 | 2,672 | 2,940 | 3,271 | 2,803 | 2,607 | 2,850 | 3,214 |
| Pound $NO_2Cl$/hour | 0.00107 | 0.00102 | 0.00151 | 0.00125 | 0.00049 | 0.00026 | 0.00018 | 0.00035 |
| Pound of $NO_2Cl$/hour/pound silica | 0.1329 | 0.1267 | 0.1873 | 0.1551 | 0.0608 | 0.0323 | 0.0223 | 0.0434 |
| Space velocity (cc./hr./cc, $SiO_2$) | 5,807 | 5,317 | 7,127 | 5,305 | 2,498 | 1,500 | 900 | 1,494 |
| Cumulative duration of run (hours) after regeneration | 1.5 | 7.25 | 13.75 | 21.5 | 29 | 35.75 | 39 | 42 |
| Cumulative pounds $NO_2Cl$/pound $SiO_2$ | | 4.7252 | 5.9427 | 7.1447 | 7.6037 | 7.8208 | 7.9149 | 8.0364 |
| Cumulative pounds total feed/pound silica | 1,077.89 | 1,285.86 | 1,599.01 | 1,877.37 | 2,005.05 | 2,073.25 | 2,098.96 | 2,127.38 |
| Cumulative pounds chlorine/pound silica | 936.49 | 1,118.28 | 1,391.34 | 1,634.32 | 1,745.79 | 1,805.40 | 1,827.81 | 1,852.65 |
| Percent $NO_2Cl$ decomposed in the gaseous feed | 84–87 | 90–94 | 86–89 | 86–94 | 97 | 81–86 | 92–93 | 97 |

[1] These runs were carried out at a temperature of 143° F, All other runs were at room temperature.

In the above examples it was again noted that lowering the space velocity, e.g., to 900 cc./hr./cc. $SiO_2$ provided better results when operating above room temperature, e.g., 143° F. In the final cumulative total, 8 pounds of $NO_2Cl$/pound of silica was effective over a period of 105 hours of operation. As recorded above, this represents a cumulative total of 1852.7 pounds of chlorine/pound of silica required for about 100% decomposition of contaminants in the oxidation effluent.

EXAMPLES 24-27

In order to test the effect of water on the high surface area silica catalyst, water was added to the feed composition of Example 2. This was accomplished by using the same procedure and equipment as outlined hereinabove, except that a glass saturator containing water maintained at 0° C. was placed in the $N_2/NO_2Cl$ line. Preliminary tests using the by-pass system showed no hydrolysis of $NO_2Cl$ when flowing $N_2$ and $NO_2Cl$ through the water saturator.

The conditions and results obtained in Examples 24–27 are reported in the following Table III. The feed composition employed was:

|  | Mol percent | Weight percent |
| --- | --- | --- |
| $NO_2Cl$ | 0.14 | 0.21 |
| $N_2$ | 22.7 | 11.0 |
| $Cl_2$ | 68.1 | 83.5 |
| HCl | 4.5 | 2.8 |
| $O_2$ | 4.5 | 2.5 |
| $H_2O$ | 0.50 | 0.14 |

TABLE III

| Example numbers | 24 | 25 | 26 | 27 |
| --- | --- | --- | --- | --- |
| Concentration $NO_2Cl$ in feed, p.p.m. | 1,112 | 1,364 | 1,719 | 1,299 |
| Pound $NO_2Cl$/hour | 0.00023 | 0.0003 | 0.00038 | 0.00025 |
| Pound of $NO_2Cl$/hour/pound silica | 0.0271 | 0.0353 | 0.0448 | 0.0294 |
| Space velocity (cc./hr,/cc. $SiO_2$) | 2,810 | 2,812 | 2,821 | 2,831 |
| Duration of run (hours) | 6 | 13 | 19.75 | 26.5 |
| Operating temperature, °F | 139 | 140 | 142 | 139 |
| Cumulative pounds $NO_2Cl$/pound $SiO_2$ | 0.162 | 0.4063 | 0.7109 | 0.9143 |
| Cumulative pound total feed/pound silica | 105.07 | 226.45 | 346.28 | 468.36 |
| Cumulative pounds chlorine/pound silica | 87.9 | 189.62 | 289.58 | 391.3 |
| Cumulative pounds $H_2O$ feed/pound $SiO_2$ | 0.0444 | 0.0933 | 0.1414 | 0.1936 |
| Cumulative pounds $H_2O$ make/pound $SiO_2$ | 0.310 | 0.0726 | 0.1287 | 0.1662 |
| Percent $NO_2Cl$ decomposed in gaseous feed | 85–91 | 81–86 | 81–86 | 82–86 |

In the above runs, no apparent aging of the $SiO_2$ catalyst was observed over the 26.5 hour operation. The amount of water which could be absorbed in the $SiO_2$ at 4.0 mm. Hg partial pressure was between 2 and 2.5 weight percent at 140° F. After 26.5 hours the $SiO_2$ showed a weight gain of 2.8%. The amount of water in contact with the $SiO_2$, including feed and water of reaction, was 36% by weight of the original charge. The $SiO_2$ was still effective at the end of the 26.5 hour period.

EXAMPLE 28

A feed having the same composition as that employed in Examples 24–27 is mixed with water so as to raise the water concentration to about 8% by weight in an effort to reproduce wet gaseous effluent which can be recovered from an oxidation reactor. The resulting mixture is then passed over the silica gel having a surface area of 500 m.$^2$/g. The operation is maintained at room temperature and atmospheric pressure at an hourly space velocity of about 1200 cc./hr./cc. $SiO_2$. The excessive amount of water in the effluent causes corrosion of the equipment and discontinuance of the operation after a relatively short period of time.

EXAMPLE 29

The general operation and feed composition employed in Example 2 was employed using a contacting zone containing a 12 inch bed of textured surface glass beads (60–80 mesh having a surface area of 0.01–0.1 m.$^2$/g.) to replace the $SiO_2$ contact material of Example 2. After 2 hours of operation, a constant $NO_2Cl$ decomposition of 5% was obtained. Obviously, this form of $SiO_2$ was not suitable for the present process. It has been found that at commerically practical space velocities, $SiO_2$ having a surface area above 50 m.$^2$/g., preferably at least 250 m.$^2$/g., is necessary to obtain substantial $NO_2Cl$ removal.

EXAMPLES 30-34

In the following examples a gaseous effluent containing chlorine obtained from the oxidation of hydrogen chloride in the presence of oxides of nitrogen which has been contacted with 95 percent sulfuric acid, is removed from the sulfuric acid drying zone and passed to a silica contacting zone, the conditions for which are listed in following Table IV. The effluent gases from the sulfuric drying zone are passed upwardly through beds of solid catalyst material containing silica.

The chlorine in Examples 30–32 is recovered by contacting the mixture with once-through 98% sulfuric acid for final clean-up, and then collecting chlorine as vapor product. In Example 33 the chlorine is recovered by contacting the mixture with once-through 98% sulfuric acid, and collecting chlorine as liquid product in a three-stage product condensation train. In the commercial design recovery of halogen product may be accomplished by contacting with once-through 98% sulfuric acid, condensation at several temperature levels, and final distillation to remove soluble low-boiling impurities from the product.

TABLE IV.—CHLORINE PURIFICATION

| Example | 30 | 31 | 32 | 33 | 34 [1] |
| --- | --- | --- | --- | --- | --- |
| | | | Pilot plant operation | | |
| Pressure (atm. abs.) | 1.0 | 15 | 15 | 15 | 15 |
| Temperature (° F.) | 68–140 | 124 | 140 | 140 | 151 |
| Inlet gas composition mole percent: | | | | | |
| $H_2O$ [2] | | | | | |
| $N_2$ | 16.1 | 64.4 | 0 | 0 | 0 |
| $Cl_2$ | 74.4 | 18.0 | 84.7 | 84.7 | 88.6 |
| HCl | 4.4 | 10.8 | 7.0 | 7.0 | 4.9 |
| $O_2$ | 4.8 | 6.7 | 8.0 | 8.0 | 6.0 |
| Nitrogen oxides ($NO_2Cl$, NOCl, $NO_2$) | 0.3 | 0.1 | 0.36 | 0.36 | 0.51 |
| Contactor bed material (surface area m.$^2$/gram) | Houdry silica gel (~500) | Davison dry silica (~600) | Linde AW-300 molecular sieves [3] (~500) | Mix, of dry silica plus Linde AW-300 sieves (~500 mixed bed) | Silica gel (~500) |
| Solid bed depth | | | | | |
| Space velocity (cu. ft. gas/hr. at above ° T, and P./cu. ft. of bed) | 660–7.800 | 1.570 | 1.050 | 145 | 1.120 |
| Res. time (seconds) | 0.5–5.5 | 2.3 | 3.4 | 25 | 3.2 |
| Run duration (hours) | 105 | 34 | 40 | 60 | |
| $NO_2Cl$ conversion (percent) | 85–99+ | 99+ | 85–90 | 99+ | 99+ |
| Total $Cl_2$ throughput (lbs./lb. bed) | 1.853 | 482 | 1.900 | 375 | 25.000 |
| Total nitrogen oxides throughput (lbs./lb. bed) | 8.0 | 3.2 | 7.6 | 1.5 | 100 [4] |

Current design values

[1] Commercial design.
[2] Inlet gas has been essentially dried. i.e,. 5–10 mole p.p.m. water.
[3] The proportion of $SiO_2$ to other metal oxide in this molecular sieve is about 10:1.
[4] Design values.

Having thus described our invention, we claim:

1. The process for the purification of halogen which comprises: in a contacting zone, contacting effluent from a halogen production process which contains hydrogen halide, water, nitroxyl halide and halogen, and wherein the concentration of water is not more than 1.5 weight percent with silica or silica-containing particles having a surface area of at least 50 m.²/g., maintaining a mole ratio of between about 1:2 and about 1:100 nitroxyl halide to hydrogen halide to effect catalyzation of nitroxyl halide to nitrosyl halide at a temperature within the range of 0° F. to 450° F. under a pressure of from atmospheric to 50 atmospheres; separating the nitrogen containing compounds and recovering halogen as the product of the process in a purified state.

2. The process of claim 1 wherein the silica is in the form of silica gel.

3. The process of claim 1 wherein the water content of the effluent is reduced to less than 0.5 weight percent prior to contact with silica.

4. The process of claim 3 wherein the effluent is dried with sulfuric acid in a drying zone prior to introduction into the silica contacting zone.

5. The process of claim 3 wherein the effluent is dried with silica or a silica-containing molecular sieve in a drying zone prior to introduction into the silica contacting zone.

6. The process of claim 1 wherein substantially wet effluent is passed through a bed of silica in which the water concentration is reduced to less than 1.5 weight percent in the direction of flow in a unitary contacting zone.

7. The process of claim 1 wherein the concentration of hydrogen halide with respect to higher valent nitrogen compounds in the silica contacting zone is maintained between about 2:1 and about 100:1 mole ratio.

8. The process of claim 1 wherein the contacting zone is packed with discrete particles of silica of an average diameter size between about 0.1 and about 25 mm.

9. The process of claim 1 wherein the nitrogen containing compounds are removed from the halogen product by scrubbing with a solution of sulfuric acid, carbon tetrachloride or water.

10. The process of claim 9 wherein the nitrogen containing compounds in solution are passed from the scrubbing zone to an oxidation zone wherein the halogen is formed.

11. The process of claim 1 wherein the silica contacting zone effluent is distilled to separate halogen from nitrogen containing compounds.

12. The process of claim 1 wherein the silica treated effluent from the silica contacting zone is contacted with concentrated sulfuric acid in a treating zone prior to separation of halogen product.

13. The process of claim 12 wherein room temperature and atmospheric pressure conditions are maintained in the sulfuric acid treating zone containing the silica-treated effluent.

14. In a process for the oxidation of an inorganic halide to produce halogen in a gaseous effluent additionally containing hydrogen halide, water and nitrogen and oxygen containing compounds, the combination of treating steps comprising:

(a) passing the reaction effluent under a pressure between about 5 and about 16 atmospheres in contact with 85-95 percent sulfuric acid in a drying zone;

(b) withdrawing the dried effluent and under a pressure substantially within the same range, contacting the effluent with silica particles or a silica-containing molecular sieve having a surface area between 100 and about 650 m.²/g. up to about 12 seconds;

(c) withdrawing the silica treated effluent and passing said effluent into sulfuric acid having a higher acid concentration than the acid in the drying zone; and (d) at least partially condensing the concentrated sulfuric treated effluent to separate oxygen from the halogen product.

15. The process of claim 14 wherein at least one of the sulfuric acid contacting zones is a packed column and the effluent and sulfuric acid are contacted in a countercurrent manner.

16. The process of claim 15 wherein the effluent from the contact with concentrated sulfuric acid contains hydrogen halide in addition to oxygen, the oxygen and hydrogen halide containing effluent is partially condensed to separate oxygen from the halogen and hydrogen halide mixture and the mixture is distilled to seperate the hydrogen halide from the halogen product.

17. The process of claim 14 wherein the acid in the drying zone is between about 90 and about 95% acid concentration and the acid in the treating zone following the contact zone is between about 96 and about 98% acid concentration.

18. The process of claim 14 wherein the dried effluent from stage (a) is passed through a demister prior to contact with said silica.

19. The process of claim 14 wherein the contacting zone comprises a first zone of silica-containing molecular sieve and a second zone of silica particles.

20. The process of claim 19 wherein the material in the first zone is independently replaced more frequently than the material in the second zone.

21. The process of claim 19 wherein the material in the first zone is independently regenerated more frequently than the material in the second zone.

22. The process of claim 14 wherein the contacting zone contains a solids mixture of silica and silica molecular sieve.

23. The process for the purification of halogen which comprises: in a contacting zone, contacting effluent from a halogen production process which contains hydrogen halide, halogen, water and an oxide of nitrogen selected from the group of nitrogen dioxide, nitrogen monoxide and nitric acid and wherein the concentration of water is not more than 1.5 weight percent with silica or silica-containing particles having a surface area of at least 50 m.²/g., maintaining a mole ratio of between about 1:1 and about 1:100 parts of oxide of nitrogen to parts of hydrogen halide to effect catalyzation of oxide of nitrogen to nitrosyl halide at a temperature within the range of 0° F. to 450° F. under a pressure of from atmospheric to 50 atmospheres; separating the nitrogen containing compounds and recovering halogen as the product of the process in a purified state.

24. The process of claim 1 wherein the halogen is chlorine.

References Cited

UNITED STATES PATENTS

| | | | |
|---|---|---|---|
| 2,309,919 | 2/1943 | Reed | 23—203 N |
| 3,201,201 | 8/1965 | Van Disk et al. | 23—219 |
| 2,692,818 | 10/1954 | Bewick | 23—219 |

FOREIGN PATENTS

| | | | |
|---|---|---|---|
| 624,313 | 2/1947 | Great Britain | 23—219 |

EARL C. THOMAS, Primary Examiner

U.S. Cl. X.R.

423—240, 241, 502, 507, 386